UNITED STATES PATENT OFFICE.

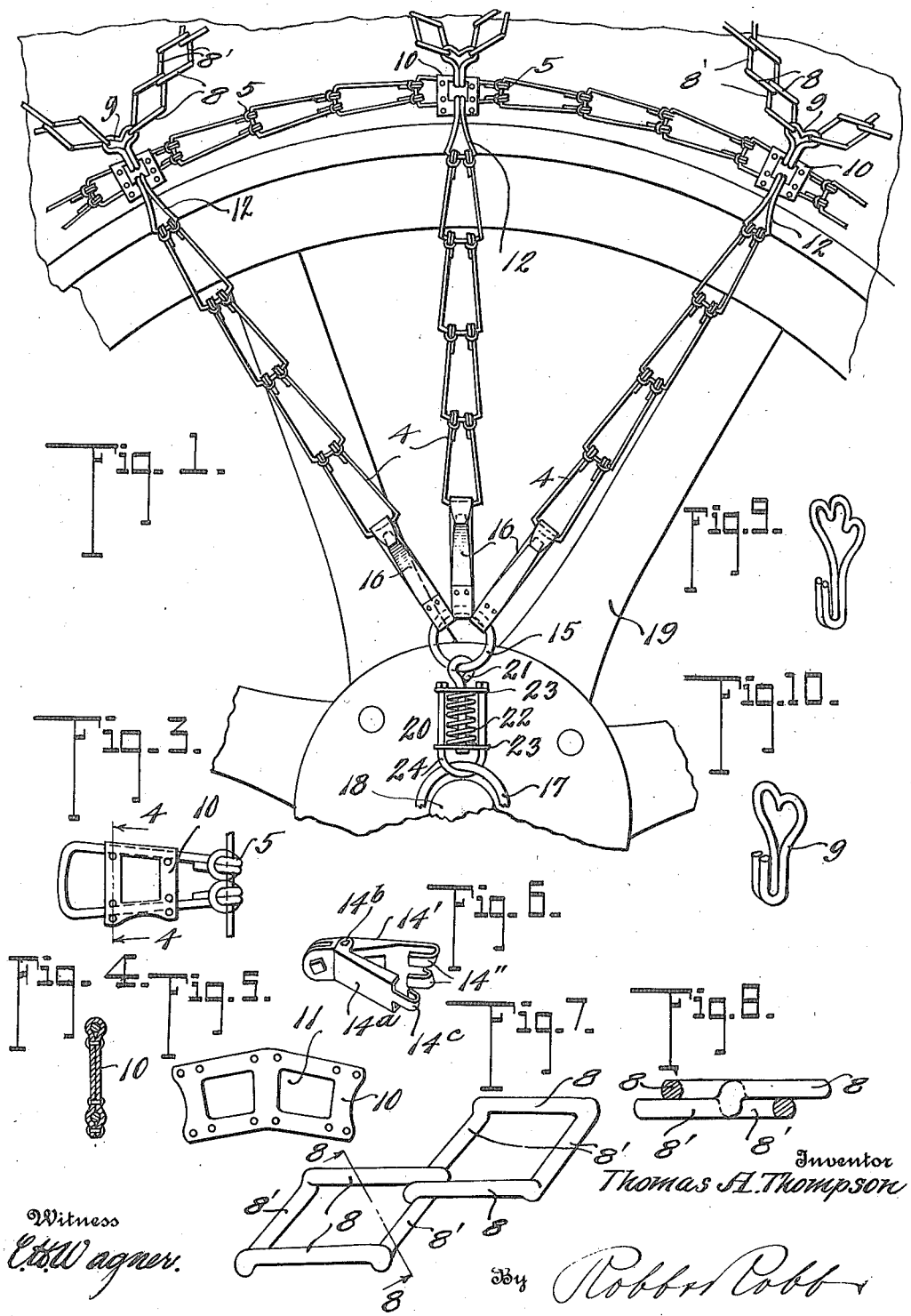

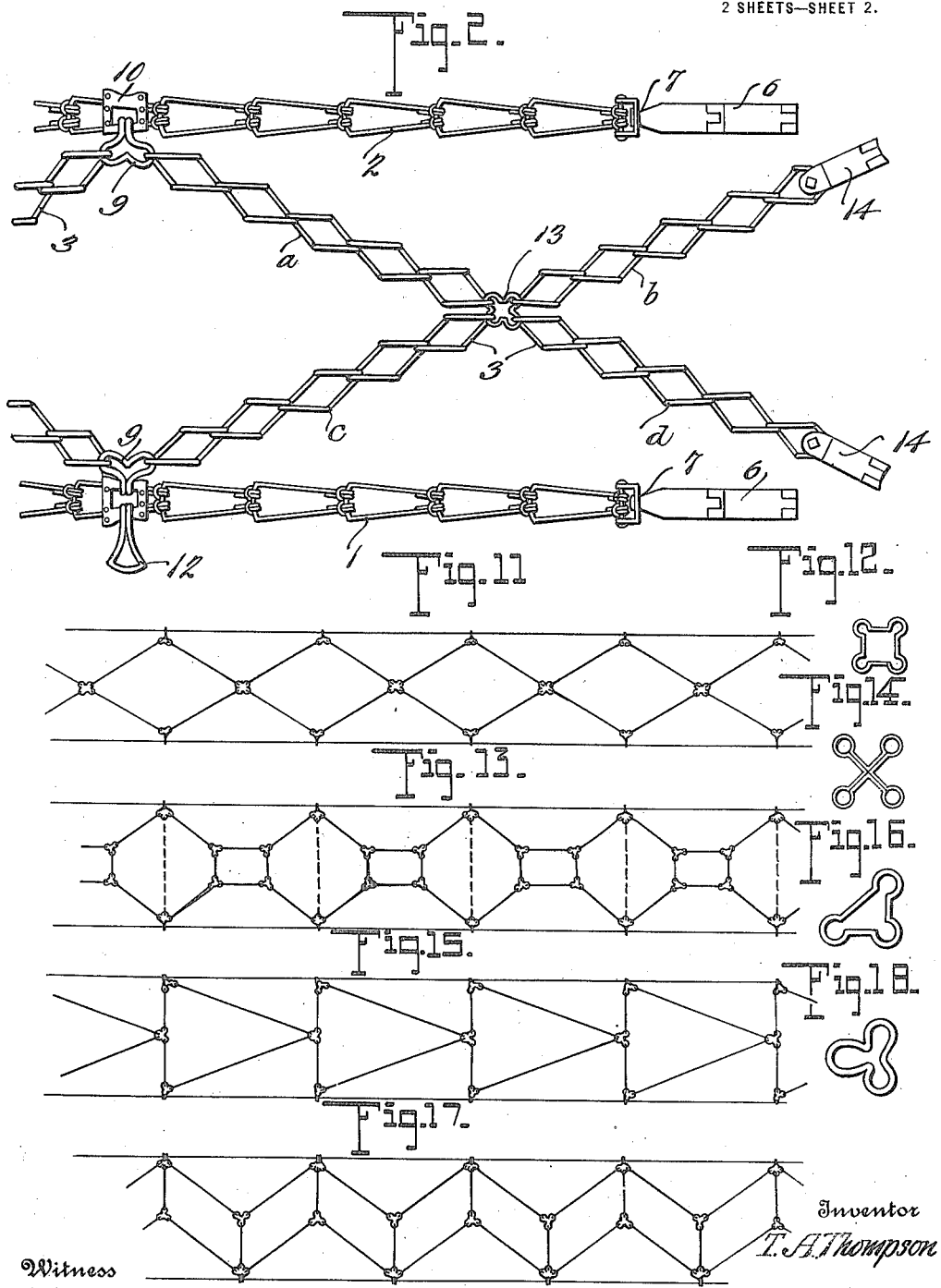

THOMAS A. THOMPSON, OF BUTTE, MONTANA.

ANTISKIDDING DEVICE.

1,190,816.  Specification of Letters Patent.  Patented July 11, 1916.

Application filed May 29, 1915. Serial No. 31,219.

*To all whom it may concern:*

Be it known that I, THOMAS A. THOMPSON, a citizen of the United States, residing at Butte, in the county of Silverbow and State of Montana, have invented certain new and useful Improvements in Antiskidding Devices, of which the following is a specification.

The present invention relates to improvements in anti-skidding devices for vehicle wheels, comprising chain elements of special type designed primarily with a view to affording constant gripping surface contact at the tread, whereby to obtain a maximum amount of traction while, at the same time, maintaining the greatest flexibility at this location.

A further object is to provide a particular form of link for the tread elements which facilitates the carrying out of the above mentioned purpose.

A still further object comprehends the provision of retaining members for the tread portion of the device for imparting tension to hold said portion in proper position preventing undue wear upon the vehicle tire or injury thereto and comprising chain links, the formation of which precludes twisting of the retaining members and tends to prevent entangling of the constituent parts when removed from the vehicle wheel, these retaining members being preferably arranged in coöperating groups to enhance the last mentioned function.

With these and such other objects as may appear hereinafter, this invention consists in the construction, combination and arrangement of parts all as hereinafter more fully described, claimed and illustrated in the accompanying drawings, wherein:

Figure 1 is a fragmentary side elevation of a vehicle wheel with an anti-skidding device constructed in accordance with my invention applied thereto. Fig. 2 is a plan view of a terminal portion of the tread section of my device. Fig. 3 is a plan view of a link in a side chain which forms a connection common to a retaining chain and certain tread or cross chains. Fig. 4 is a transverse sectional view on the line 4—4 of Fig. 3. Fig. 5 is a plan view of a clip prior to attachment to the link chain in Fig. 3. Fig. 6 is a perspective view of a connecting hook for the tread-chains or members. Fig. 7 is a perspective view of a pair of links used in the tread members. Fig. 8 is a transverse section on the line 8—8 of Fig. 7. Fig. 9 is a detail view of a connecting hook designed to be used in conjunction with the form of chain shown in Fig. 17. Fig. 10 is a similar view of a connecting hook used in the preferred embodiment of the chain for connecting two tread members with the side chain. Fig. 11 illustrates diagrammatically, the preferred arrangement of tread members. Fig. 12 is a detail view of the connecting ring employed at the intersection of the tread members shown in Fig. 11. Fig. 13 illustrates diagrammatically a modified arrangement of the tread members. Fig. 14 shows another form of connecting ring or member that may be substituted for the form disclosed in Fig. 12. Fig. 15 illustrates a modified arrangement of the tread members. Fig. 16 is a detail view of the connecting member for the intersecting tread elements shown in Fig. 13 or 15. Fig. 17 is another embodiment of tread arrangement comprehended by my invention; and Fig. 18 a modified form of connecting member similar to that disclosed by Fig. 16.

Throughout the following detailed description, and on the several figures of the drawings, similar parts are referred to by like reference characters.

Referring to the drawings, and specifically describing the device constructed in accordance with my invention, the numeral 1 designates an annular side chain, 2 a corresponding side chain arranged parallel thereto for disposition at the opposite side of a vehicle tire, 3 a tread member generally, and 4 the retaining members of which my invention consists. In order to most clearly understand this device, these several members or elements above referred to will be specifically described. As will be noted from Figs. 1 and 2, the side chains 1 and 2 are similarly constructed with respect to their link members, one of said links being more clearly illustrated in Fig. 3 of the drawing. The link comprises a piece of wire which is doubled back and each terminal of the piece is bent so as to form an eye to engage the doubled end of the next link. In Fig. 3, the eye, which is designated 5, is formed by bending the end of one side of the link over the next link, back over the side member itself, then under the next link again and finally passing the end back through the overlying loop; thus the ends of each side are located between the side members of the link and when pressed together the connection is firm and unlikely to slip when the chain is placed under stress. It will be apparent that this particular formation of the links of the side chains provides for flexing of the chains longitudinally or circumferentially of the wheel, but the link members of which these chains are composed cannot twist and in the actual assembly of the parts lie always flat against the vehicle wheel or tire owing to their flatness and the tension of the retaining members. This particular form of link is also employed in making up the retaining members or chains 4 and the same tendency to prevent twisting exists in respect to these members.

It will be noted particularly by reference to Fig. 2 that the side chains 1 and 2 each terminate in a double connecting hook 6 which has swivel connection with the end of the chain as indicated at 7.

The tread portion 3 of my invention consists of a plurality of chain sections which, for the purposes of this description are separately designated $a$, $b$, $c$ and $d$. These cross or tread chains consist preferably of diamond shaped links which are most clearly shown in Figs. 7 and 8 of the drawings wherein each link is formed with parallel sides 8 which lie in the same plane while the other parallel sides 8' are offset into another plane. The purpose in view of this special form of link is to provide raised tread portions for each link affording the maximum gripping surface and enabling reversal of the links when one side of said links becomes worn from continuous use. The arrangement of the tread sections or members above referred to appears in plan of diamond formation, and in this connection, the tread members are made of proper length and so connected to the side chains 1 and 2 that the distance between the points of connection of two of the tread members, for instance $a$—$c$ with the side members 1 and 2 is shorter than the distance between the points of connection of the tread members such as $c$ and $d$ to the side chains. This is an important feature of my construction in that there is a constant contact of these tread members with the surface upon which the vehicle tire operates throughout the rotation of the wheel, and hence the traction is constant. The form of link of these tread members, it may also be added, allows the cross chains to lie perfectly flat on the tire without tendency to twist or turn, and thereby cause injury to the tire material. The tread members 3 are connected to the side chains by hooks 9, shown most clearly in Fig. 10, said hooks having a double eye at one end and the terminals at the other end bent back through a clip 10 which is secured to a link of the side chains. The clip 10, as shown in Figs. 3, 4 and 5 consists of a piece of metal bent back over the sides of the link of the side chain, being riveted together and having an opening 11 to accommodate the hook connection 9. Each of the side chains is provided with these clips at regular intervals, the outer one, however, having an opening which is sufficient to accommodate not only the tread connections 9 but the terminal hook 12 of a retaining chain 4. At the point of intersection of the tread chains is provided a suitable link or ring common to the four members $a$, $b$, $c$ and $d$, this ring 13 being constructed as shown most clearly in detail in Fig. 12 where the preferred diamond shape arrangement of the cross chains is employed.

Referring again to Fig. 2, the end tread members of the device are each provided with a terminal hook 14, which is most clearly shown in Fig. 6 of the drawings. This hook consists of a bottom portion 14' having bifurcated upturned hooks 14", and a spring actuated element 14$^a$ pivotally connected to the bottom at 14$^b$ and having a hook end 14$^c$ adapted to seat between the oppositely turned ends 14" just mentioned. Hence, with the opposite ends of the chain engaged in these hooked ends, the two members 14' and 14$^a$ are held together and to release the ends of the chain, it is only necessary to move the end links out of the hooked ends 14" and 14$^c$ whereupon the connecting hooks 14 will open for displacement of the chain from the wheel.

As shown in Fig. 1 of the drawing, the retaining members 4 are arranged in groups, three of such members constituting a group, the converging ends of which connect to a ring 15, each of the ends being provided with a snap hook 16 for this purpose. Each ring 15 of a group is connected to a central ring 17 disposed on the hub 18 of a wheel 19 by a spring device 20, the latter consisting of an eye bolt 21, a spring 22 interposed between spaced plates 23 mounted on a U-shaped member 24. In this manner a resilient connection is afforded the tread portion of the device and the retaining members being connected to the side chains at the points of common connection of the tread chains with said side chains maintain the tread members or cross chains in proper position upon the surface of the tire carried by the wheel 19. It will be understood from the above description that the ring 17 engages the hub 18 so as to form a positive connection to the wheel. For this reason the stress of the gripping action on the tread chains is transmitted longitudinally of these chains to the retaining chains and direct to the wheel. This is very important, since it maintains the tread chains in their proper position on the tire, preventing them from twisting and insuring a positive gripping action. This longitudinal application of the stress is, as has been hereinbefore premised, due to the special angular arrangement of the intersecting cross chains of the device.

As hereinbefore premised, the arrangement of the retaining members in groups tends to prevent entanglement of the chain elements and greatly facilitates the attachment of the anti-skidding device comprehended by the foregoing description.

As disclosed diagrammatically in Figs. 13, 15 and 17, it is comprehended to employ slightly different arrangements of the tread sections or cross chains but with respect to each of these arrangements, the advantageous features of the preferred form are maintained, and, I, therefore, do not wish to be confined to the arrangement illustrated in Figs. 2 and 11.

In the different arrangements of Figs. 13, 15 and 17 a slightly different form of connecting ring or member becomes desirable, and such changes of these elements are best disclosed by Figs. 9, 16 and 18 respectively.

Having thus described my invention, what I claim as new is:

1. An anti-skidding device for vehicle wheels comprising cross chains, circumferential side chains, radially extending retaining chains connected to the side chains at the points of connection of the cross chains therewith, connecting members for groups of said retaining chains, and means connecting the said last mentioned connecting members to the wheel whereby stress on the cross chains due to gripping action is transmitted to the wheel.

2. An anti-skidding device for vehicle wheels comprising intersecting cross chains, circumferential side chains, radially extending retaining chains connected to the side chains at the points of connection of the cross chains therewith, connecting members for groups of said retaining chains, and yieldable means connecting each group of connecting members to the wheel.

3. An anti-skidding device for vehicle wheels comprising cross chains, side chains, clip members connected to links of the side chains at regular intervals throughout their length, connecting hooks for the cross chains connecting said cross chains to the clip members, and retaining chains connected at one end to the clip members of one of said side chains aforesaid, ring members connecting certain of said retaining chains at their other ends in groups, a hub engaging ring, and a yieldable device between each of the rings for the retaining chains and the hub engaging ring.

4. An anti-skidding cross chain for tires comprising diamond-shaped links, each link having its parallel sides off-set in opposite directions to form a continuous tread from end to end of the link and a continuous tire engaging surface from end to end of the link.

In testimony whereof I affix my signature.

THOMAS A. THOMPSON.